March 15, 1949.  H. E. EKLUND  2,464,678
ARRANGEMENT FOR GEAR CHANGING SYSTEMS
Filed Sept. 19, 1946  3 Sheets-Sheet 1

March 15, 1949.　　　H. E. EKLUND　　　2,464,678
ARRANGEMENT FOR GEAR CHANGING SYSTEMS
Filed Sept. 19, 1946　　　3 Sheets-Sheet 2

Inventor:
Hans Erik Eklund,
By: Pierce, Scheffler & Parker,
Attorneys.

March 15, 1949. H. E. EKLUND 2,464,678
ARRANGEMENT FOR GEAR CHANGING SYSTEMS
Filed Sept. 19, 1946 3 Sheets-Sheet 3

Inventor:
Hans Erik Eklund;
By: Pierce, Scheffler & Parker,
Attorneys.

Patented Mar. 15, 1949

2,464,678

UNITED STATES PATENT OFFICE 2,464,678

ARRANGEMENT FOR GEAR CHANGING SYSTEMS

Hans Erik Eklund, Malmo, Sweden, assignor to Aktiebolaget Ljungmans Verkstader, Malmo, Sweden, a corporation of Sweden Application September 19, 1946, Serial No. 698,029
In Sweden February 15, 1945

Section 1, Public Law 690, August 8, 1946
Patent expires February 15, 1965

7 Claims. (Cl. 74—347)

The present invention relates to gear changing systems comprising a gear wheel having a number of gear rims located radially outside one another, the direction of depth of the teeth being substantially parallel to the direction of the gear wheel shaft, and one or more gear wheels cooperating with the gear rims on the gear wheel, whereby the gear wheel provided with the gear rims can be displaced in its axial direction by means of an operating member, and the gear wheel or gear wheels cooperating with the gear rims can be displaced in their axial directions by means of other operating members.

The object of the invention is to construct the arrangement in such a way that it will be impossible to make any incorrect adjustment between the gear wheels and gear rims which would lead to their mutual injury. Another object of the invention is to read off directly or indirectly the gear rim with which the gear wheel or gear wheels is or are in engagement.

Figure 1:
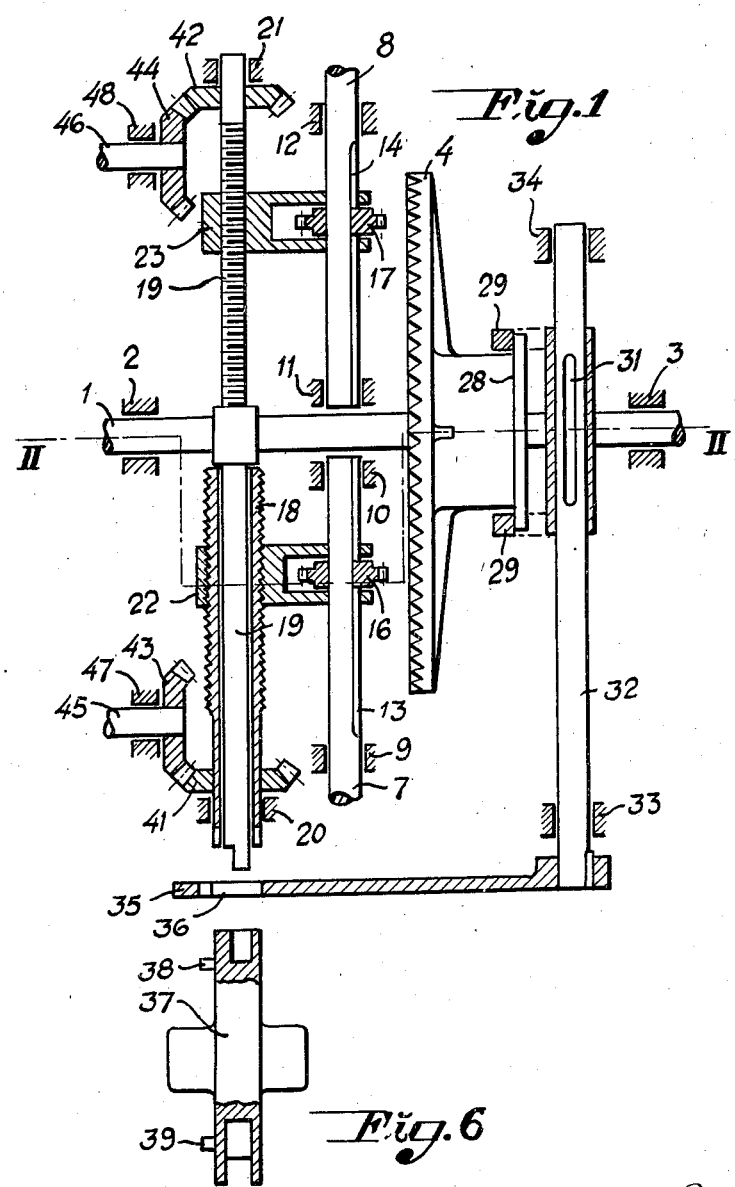
Figure 2:
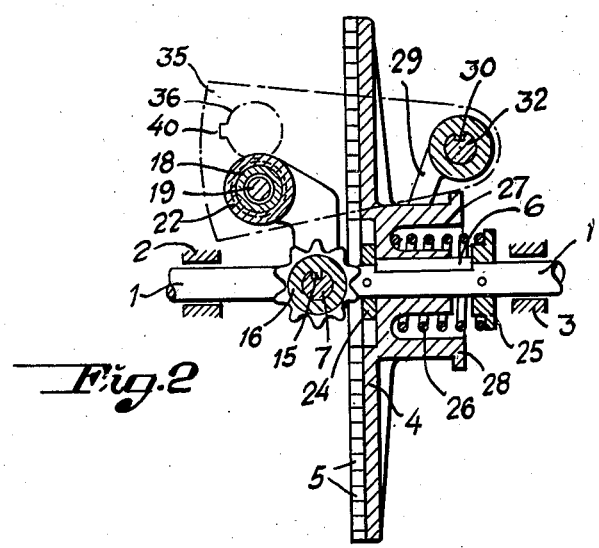
Figure 3:
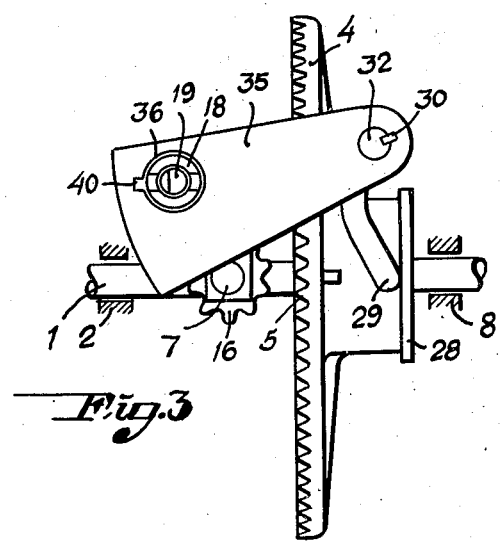
Figure 4:
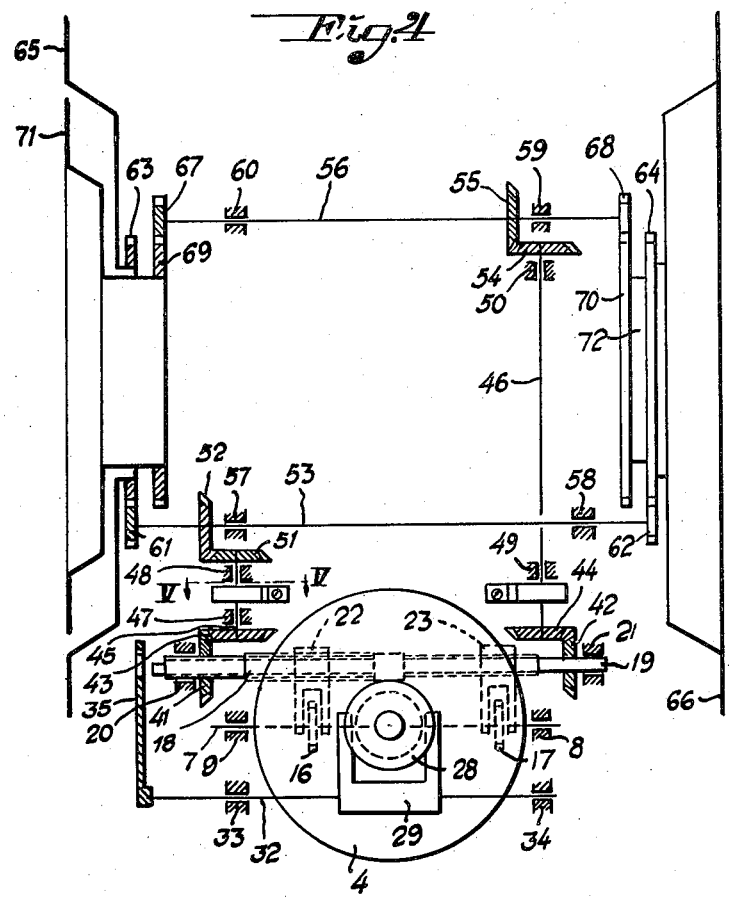
Figure 5:
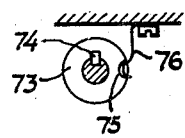

The invention is illustrated by way of example in the accompanying drawings in which Fig. 1 shows, partly in section, a gear wheel having a flat end surface and provided with a number of gear rims located radially outside one another (the gear rims are not specially shown however), the said gear wheel in the position shown being axially displaced with respect to two gear wheels cooperating with its gear rims, Fig. 2 is a section through Fig. 1 along the line II—II but showing the gear wheel in engagement with a gear rim, Fig. 3 is an elevation of Fig. 2 with the gear wheels disengaged from one another, Fig. 4 is a diagrammatic view according to Fig. 1 with the indicating device, and Fig. 5 is a section through Fig. 4 along the line V—V, whilst Fig. 6 shows a key for turning the screw-threaded shafts.

Referring to Fig. 1, 1 is a driving shaft which is rotatably supported in the fixed bearings 2 and 3. On the shaft 1 the gear wheel 4 is mounted and is provided with concentric gear rims 5 located inside one another in the same plane (see Fig. 2). The gear wheel 4 can be displaced axially on the shaft 1 and is in driving connection with the latter by means of a key 6 (Fig. 2). At right-angles to the shaft, on the same side as the gear wheel 4 and in a straight line with each other, are two shafts 7 and 8 supported in the fixed bearings 9, 10 and 11, 12. Each shaft is provided with a longitudinal keyway 13 and 14 with which a key or projection 15 (Fig. 2) on the two respective shafts 7, 8 surrounded by gear wheels 16 and 17, engages so that the gear wheels 16, 17 can be displaced axially along their shafts.

Parallel to the shafts 7, 8, the shafts 18, 19 are arranged, of which the shaft 19 has its one end supported in a tubular bore in the shaft 18. The shaft 18 is in addition rotatably mounted in the fixed bearing 20, and the shaft 19 in the fixed bearing 21. Each shaft 18, 19 is rotatable in its bearings but cannot be displaced axially. Each shaft 18, 19 is provided externally with screw threads and is surrounded by a yoke 22 and 23 which is provided with threads corresponding to the screw threads on the shaft, for the axial displacement of the yoke along the shafts when the latter are turned. The respective yokes 22, 23, surround with their limbs one of the gear wheels 16, 17, and are guided by the shafts 7, 8 which they surround. The end of the shaft 19 which is taken out through shaft 18, as well as the end of the shaft 18, are each formed in a special manner, so that each of them is adapted to engage with its own key of the type shown in Fig. 6. One end of the key is adapted for the shaft 18 and the other end for the shaft 19, and the same key end can only actuate one of the shafts. By turning first one shaft, for example 18, with the key and then the other shaft 19, the yokes 22 or 23 can be displaced along the shafts, and with them the gear wheels 16 or 17. Before the displacement the gear wheel 4 must first be disengaged from the gear wheels 16, 17. In this way any desired adjustment between the gear wheels 16, 17 and any one of the gear rims 5 on the gear wheel 4 can be obtained.

In order to bring the gear wheel 4 into or out of engagement with the gear wheels 16, 17 a special arrangement is employed. According to the latter the gear wheel 4 can be displaced axially on the shaft 1 and along the keyway 6 between the stop 24 and flange 25 which are rigidly connected to the shaft 1. The spiral spring 26, located between the flange 25 and a notch 27 in the gear wheel 4, constantly presses the gear wheel 4 in the direction of the stop 24 which is so designed that suitable engagement between the teeth of the gear wheels is obtained when the gear wheel 4 lies up against this stop. The gear wheel 4 is further provided with an annular flange 28 in front of which a fork 29 grips around the hub portion of the gear wheel 4. The fork 29 is rigidly mounted by means of a key 30 and keyway 31 on a rotatable shaft 32 which is supported in the fixed bearings 33 and 34. To the shaft 32 a arm 35 is rigidly connected which is adapted to turn the shaft 32 and thus effect the engagement and disengagement of the gear wheel 4. The appearance of the arm 35 may be seen from Fig. 3. The arm 35 is provided with a hole 36 the shape of which corresponds to the external form of the key 37 (Fig. 6). The external form of the key is the same at both ends so that either end of the key may be introduced through the hole 36. The two ends of the key only differ from one another in the form of the notches in their end surfaces. The arm 35 has the hole 36 so located that when the gear wheel 4 is in engagement with the gear wheels 16, 17, the hole is over the ends of the shafts 18, 19 (Fig. 2). In this position it is impossible therefore, by inserting the key through the hole 36, to bring the key into rotating engagement with either of the shafts 18, 19. Only after the arm 35, through the turning of the shaft 32, has caused the gear wheel 4 to disengage from the gear wheels 16, 17 and the hole 36 in the arm has come immediately in front of the ends of shafts 18, 19, the key 37 can in its correct order be caused to engage with these shafts and alter the adjustment of the gear wheels 16, 17 relatively to the gear rims on the gear wheel 4. This offers a certain method for preventing the displacement of the gear wheels 16, 17 except when they are disengaged from the gear wheel 4, so that these gear wheels can never injure one another during adjustment. By further providing the threads on the shafts 18, 19 with such a pitch that, on turning one revolution, they correspond to a displacement of the gear wheel 16 or 17 for a distance equal to the distance between one gear rim and the next gear rim adjoining it on the gear wheel 4, and owing to the fact that the key can only be removed after the completion of a whole revolution, a safety system is obtained which ensures that the gear wheels 16, 17 can never be incorrectly adjusted in relation to any gear rim. If by accident the key should not be removed when the gear is set in motion, the only effect of this will be that the gear wheel 4 will rotate without being engaged with the gear wheels 16, 17. Thus the coupling cannot be subjected to any risk of incorrect adjustment and is what is known as "fool-proof."

The key 37 is cylindrical at both ends and, in addition, has a radially projecting pin 38 or 39 at each end, both of which are exactly similar, and the hole 36 in the arm 35 has a notch 40 corresponding to the pins. Thus it is only possible to introduce the key through the hole in a certain position and to remove it in the same position after it has been turned one or more whole revolutions.

The shafts 7 and 8 are the outgoing or driven shafts the speed of which it is desired to vary by means of the gear changing system. These shafts may be applied to driving any apparatus whatsoever. Their movements may also be combined in such a way that they are added or subtracted from each other in a price calculating mechanism in measuring apparatus for the retailing of a fluid for example. In the latter case the shaft 1 is driven by the measuring apparatus and the shafts 7 and 8 drive the price calculating mechanism after their movements have been added together by a differential gear or the like for example.

Fig. 4 shows diagrammatically the arrangement according to Fig. 1 provided with devices permitting the direct or indirect reading on disc wheels of the adjustment between the gear wheels 16, 17 and the gear rims on the gear wheel 4. The same symbols have been employed in Fig. 4 as in the other figures for similar parts. On the shaft 18 or 19 a bevel gear wheel 41 and 42 respectively is rigidly mounted and is in engagement with the bevel gear wheel 43 and 44 respectively on the ends of the shafts 45 and 46 respectively. These shafts are supported in the fixed bearings 47, 48 and 49, 50 respectively. On the shaft 45 the bevel gear wheel 51 is rigidly mounted and is in engagement with the bevel gear wheel 52 rigidly mounted on the shaft 53. On the shaft 46 the bevel gear wheel 54 is rigidly mounted and is in engagement with the bevel gear wheel 55 rigidly mounted on the shaft 56. The shaft 53 is rotatably supported in the fixed bearings 57 and 58 whilst the shaft 56 is rotatably mounted in the fixed bearings 59 and 60. The shaft 53 carries at each end a rigidly mounted gear wheel 61 and 62 which are in driving engagement with the gear wheels 63 and 64 which in turn are rigidly mounted each on its own disc wheel 65 and 66 which are provided with a scale. In the same manner the shaft 56 carries at each end a gear wheel 67 and 68 which are in engagement with the gear wheels 69 and 70 respectively, the latter being rigidly mounted each on its own disc wheel 71 and 72. The disc wheels 65, 71 and 66, 72 are adapted to rotate shafts in front of them, not shown, in such a way that one shaft of tubular form is supported around the other. For the purpose of reading the adjustments the disc wheels may be covered with discs provided with windows which permit the scales to be read. The scales may be so graduated that they indicate directly with which gear rim the particular gear wheel 16 or 17 is engaged, or they may indicate this indirectly and register directly the units of cents or tens of cents for which the respective gear wheels 16, 17 are adjusted. Thus if the shafts 7 and 8 are to drive a price calculating mechanism which is to be adjustable for all values between 0 and 100 cents per liter for example, the gear wheel 16 is placed in engagement with the gear rim which corresponds to the unit figure for the price per liter, and the gear wheel 17 with the gear rim corresponding to the tens figure. The adjusted price per liter will then be visible through the windows and be conveniently checked. The manner in which the shafts 7 and 8 subsequently cooperate to transmit their respective movements to a common price calculating mechanism does not form a part of the present invention.

On the shafts 45 and 46 a disc 73 is rigidly mounted by means of a key 74 (see Fig. 5). The outer surface of the disc 73 is provided with a notch 75 and one end of a fixed spring 76 lies against the surface of the disc and has a bent-out portion 77 at its free end, the said bent-out portion being able to snap into the notch 75 owing to the force of the spring. On each revolution of the shaft 45 or 46 the spring will snap into the notch 75 once, which is perceptible on turning the shafts 18 or 19 with the key. By locating the discs 73 so that the snapping action occurs just at the moment in which the gear wheels 16, 17 are immediately in front of a gear rim on the gear wheels 4, it will be possible to ascertain by touch when the adjustment is correct.

What I claim is:

1. In a gear changing system, a gear wheel having a number of gear rims located radially outside one another, the direction of depth of the teeth being substantially parallel to the direction of the shaft of said gear wheel, an operating member for moving said gear wheel in its axial direction, at least one gear wheel displaceable along its shaft and cooperating with said gear rims, a yoke supported on a screw-threaded shaft parallel with the shaft of said displaceable gear wheel, the limbs of said yoke gripping said displaceable gear wheel and being guided by the shaft of said last gear wheel, whereby rotation of said screw-threaded shaft displaces said yoke and consequently, said displaceable gear wheel in the longitudinal direction of its shaft and means for preventing said screw-threaded shaft from being rotated when said gear wheel provided with the gear rims is in engagement with said displaceable gear wheel.

2. In a gear changing system, a gear wheel having a number of gear rims located radially outside one another, the direction of depth of the teeth being substantially parallel to the direction of the shaft of said gear wheel, an operating member for moving said gear wheel in its axial direction, two gear wheels displaceable along their shafts and cooperating with said gear rims, said shafts being located in a straight line, two yokes supported on two screw-threaded shafts parallel with the shafts of said displaceable gear wheels, an extension on one of said screw-threaded shafts passing through a tubular bore in the other shaft, whereby both shafts are rendered accessible at the same shaft end, the limbs of said yokes gripping said displaceable gear wheels and being guided by the shafts of said last gear wheels, whereby rotation of the screw-threaded shafts displaces the corresponding yokes and said displaceable gear wheels in the longitudinal direction of their shafts, and means for preventing said screw-threaded shafts from being rotated when said gear wheel provided with the gear rims is in engagement with said displaceable gear wheels.

3. In a gear changing system, a gear wheel having a number of gear rims located radially outside one another, the direction of depth of the teeth being substantially parallel to the direction of the shaft of said gear wheel, at least one gear wheel displaceable along its shaft and cooperating with said gear rims, a fork mounted on a rotatable shaft for bringing said gear wheel provided with the gear rims into or out of engagement with said displaceable gear wheel by rotation of said shaft, for each displaceable gear wheel a yoke supported on a screw-threaded shaft parallel with the shaft of said displaceable gear wheel, the limbs of said yoke gripping said displaceable gear wheel and being guided by the shaft of said last gear wheel, whereby rotation of said screw-threaded shaft displaces said yoke and, consequently, said displaceable gear wheel in the longitudinal direction of their shafts, and a disc mounted on a shaft and so connected with said fork that in a position in which said gear wheel provided with the gear rims is in engagement with said displaceable gear wheel, said disc covers the end of said screw-threaded shaft, whereby said last shaft is not accessible for fitting a key to it for the purpose of turning it.

4. In a gear changing system, a gear wheel having a number of gear rims located radially outside one another, the direction of depth of the teeth being substantially parallel to the direction of the shaft of said gear wheel, at least one gear wheel displaceable along its shaft and cooperating with said gear rims, a fork mounted on a rotatable shaft for bringing said gear wheel provided with the gear rims into or out of engagement with said displaceable gear wheel by rotation of said shaft, for each displaceable gear wheel a yoke supported on a screw-threaded shaft parallel with the shaft of said displaceable gear wheel, the limbs of said yoke gripping said displaceable gear wheel and being guided by the shaft of said last gear wheel, whereby rotation of said screw-threaded shaft displaces said yoke and, consequently, said displaceable gear wheel in the longitudinal direction of their shafts, and an arm mounted on a shaft and so connected with said fork that in a position in which said gear wheel provided with the gear rims is in engagement with said displaceable gear wheel, said arm covers the end of said screw-threaded shaft, whereby said last shaft is not accessible for fitting a key to it for the purpose of turning it, while a hole in said arm having a contour in the shape of said key allows the insertion of said key when the arm occupies the position corresponding to disengagement between said gear wheel provided with the gear rims and said displaceable gear wheel.

5. In a gear changing system, a gear wheel having a number of gear rims located radially outside one another, the direction of depth of the teeth being substantially parallel to the direction of the shaft of said gear wheel, at least one gear wheel displaceable along its shaft and cooperating with said gear rims, a fork mounted on a rotatable shaft for bringing said gear wheel provided with the gear rims into or out of engagement with said displaceable gear wheel by rotation of said shaft, for each displaceable gear wheel, a yoke supported on a screw-threaded shaft parallel with the shaft of said displaceable gear wheel, the limbs of said yoke gripping said displaceable gear wheel and being guided by the shaft of said last gear wheel, the screw-threaded shaft haivng such a pitch that turning of the shaft by one revolution by means of a key will correspond to a displacement of said displacement gear wheel by means of said yoke over the distance from one gear rim to the next gear rim, and an arm mounted on a shaft and so connected with said fork that in a position in which said gear wheel provided with the gear rims is in engagement with said displaceable gear wheel, said arm covers the end of said screw-threaded shaft, whereby said last shaft is not accessible for fitting a key to it for the purpose of turning it while a hole in said arm having a contour in the shape of said key allows the insertion of said key when the arm occupies the position corresponding to disengagement between said gear wheel provided with the gear rims and said displaceable gear wheel.

6. In a gear changing system, a gear wheel having a number of gear rims located radially outside one another, the direction of depth of the teeth being substantially parallel to the direction of the shaft of said gear wheel, an operating member for moving said gear wheel in its axial direction, at least one gear wheel displaceable along its shaft and cooperating with said gear rims, a yoke supported on a screw-threaded shaft parallel with the shaft of said displaceable gear wheel, the limbs of said yoke gripping said displaceable gear wheel and being guided by the shaft of said last gear wheel, whereby rotation of said screw-threaded shaft displaces said yoke and, consequently, said displaceable gear wheel in the longitudinal direction of its shaft, a gearing connected with said screw-threaded shaft, a device driven by said gearing and adapted for indicating the gear rim with which said displaceable gear wheel is in engagement, and means for preventing said screw-threaded shaft from being rotated when said gear wheel provided with the gear rim is in engagement with said displaceable gear wheel.

7. In a gear changing system, a gear wheel having a number of gear rims located radially outside one another, the direction of depth of the teeth being substantially parallel to the direction of the shaft of said gear wheel, an operating member for moving said gear wheel in its axial direction, at least one gear wheel displaceable along its shaft and cooperating with said gear rims, a yoke supported on a screw-threaded shaft parallel with the shaft of said displaceable gear wheel, the limbs of said yoke gripping said displaceable gear wheel and being guided by the shaft of said last gear wheel, whereby rotation of said screw-threaded shaft displaces said yoke and, consequently, said displaceable gear wheel in the longitudinal direction of its shaft, a gearing connected with said screw-threaded shaft, a device driven by said gearing and adapted for indicating the gear rim with which said displaceable gear wheel is in engagement, a spring catch connected with said screw-threaded shaft and operating in the positions of rotation of said screw-threaded shaft, in which said displaceable gear wheel is immediately in front of a gear rim, and means for preventing said screw-threaded shaft from being rotated when said gear wheel provided with the gear rim is in engagement with said displaceable gear wheel.

HANS ERIK EKLUND.

REFERENCES CITED

The following references are of record in the file of this patent:

UNITED STATES PATENTS

| Number | Name | Date |
| --- | --- | --- |
| 871,337 | Hawley et al. | Nov. 19, 1907 |
| 913,623 | Dallison | Feb. 23, 1909 |
| 940,342 | Milne | Nov. 16, 1909 |
| 1,007,890 | Rash et al. | Nov. 7, 1911 |